April 4, 1939. J. M. AUZIN 2,152,725
MARKING
Filed Sept. 30, 1936
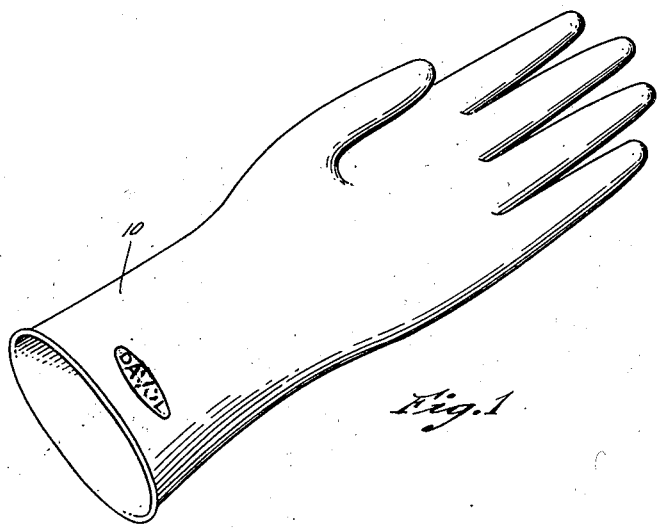
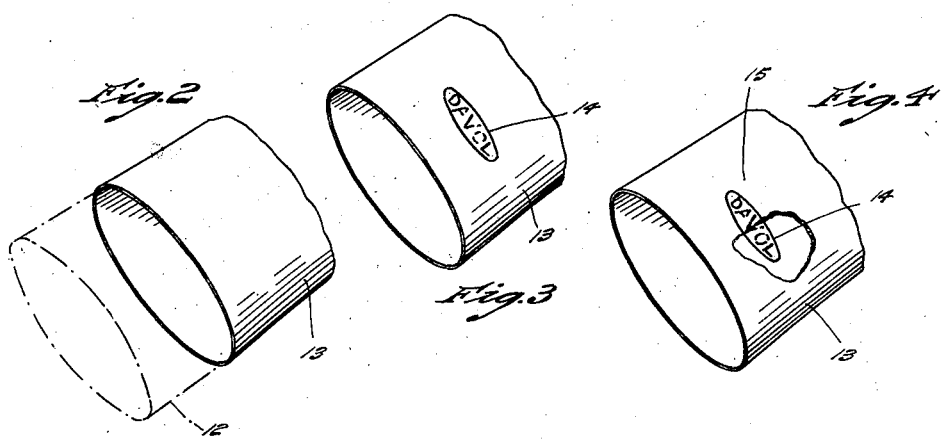
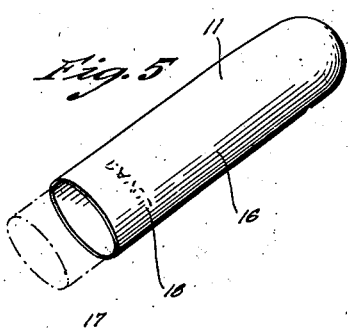
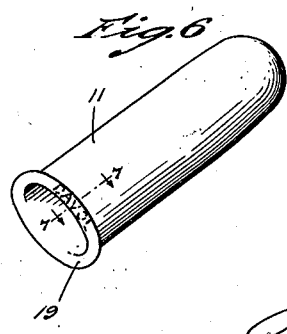
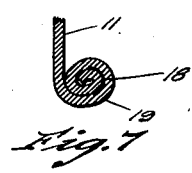
Inventor
John M. Auzin
By Nathaniel Frucht
Attorney Patented Apr. 4, 1939

2,152,725

UNITED STATES PATENT OFFICE 2,152,725

MARKING

John M. Auzin, Warwick, R. I., assignor to Davol Rubber Company, a corporation of Rhode Island Application September 30, 1936, Serial No. 103,285

2 Claims. (Cl. 18—58)

My present invention relates to markings, and has particular reference to markings on transparent or translucent articles of rubber and the like.

The marking of rubber articles, such as for example surgeons' gloves, is difficult, as the articles are sterilized in boiling water. Ordinary printing is therefore soon removed; it has been proposed to use a small tab having printing on its inner surface, which is then welded to the inner surface of the article, but this method has obvious disadvantages.

It is the principal object of my invention to provide an improved method of marking transparent and translucent articles, whereby the markings are below the article surface.

It is a further object of my invention to include the markings as part of the manufacture of the articles.

With the above and other objects and advantageous features in view, my invention consists of a novel method of procedure disclosed in the detailed description following, in conjunction with the accompanying drawing, and more specifically defined in the claims appended thereto.

In the drawing,

Fig. 1 is a perspective view of a surgeon's glove, marked in accordance with the novel method;

Fig. 2 is a perspective view of the article during its manufacture, prior to marking;

Fig. 3 is a similar view showing the step of marking;

Fig. 4 is a perspective view, broken away to show the sub-surface marking;

Fig. 5 is a perspective view of another article of different form;

Fig. 6 is a perspective view of the completed article, and

Fig. 7 is an enlarged section on the line 7—7 of Fig. 6.

Referring to the drawing, the articles, such as the surgeon's glove 10 illustrated in Fig. 1, and the finger cot 11 illustrated in Fig. 6, are marked during their manufacture so as to permanently imbed the markings below the surface of the article. Thus, the glove, see Fig. 2, is formed by dipping a core 12 in a solution of rubber or rubber compound, either natural or synthetic; after one or more coats 13 have been formed on the core, a stamp such as indicated at 14 is placed on the outer surface, by using a suitable ink.

The ink, if liquid ink is used, is preferably allowed to set for a short time, and successive coats are again applied to the dipped article to obtain the final coating 15, whereby the marking is imbedded in the article beneath the surface. If preferred, a dry powder may be used, carbon black being suitable for black markings, the stamp for the markings being pressed or rubbed against a felt pad treaded with the powder.

The above described method is suitable for direct stampings, the resultant markings being clearly visible. If the markings are preferred on a roll portion such as is standard for example on finger cots, a reversed marking is necessary.

Thus, referring to Figs. 5 to 7, the finger cot blank 16 is coated on the form 17 by successive dippings, and the markings 18 are placed thereon at a predetermined distance from the lower end, in reversed form. The roll portion or bead 19 is then formed by rolling the end, and the markings 18 become positioned on the second layer, see Fig. 7, in upright position. The roll portion or bead cures to become integral, whereby the markings are disposed beneath the surface of the article.

It is thus evident that the markings are within the body of the finished product, whereby washing, boiling, and scrubbing can not dim or erase the markings. While I have described the invention in connection with transparent and translucent rubber and rubber compound articles, both natural and synthetic, it is obvious that the invention can be applied to any transparent and translucent product that is manufactured by a coating process, by placing the markings on the product in an intermediate stage of the coating. The term "coating" is used in a broad sense, to mean applying successive coats in any manner, as by dipping, spraying or brushing. The invention can also be applied to opaque products manufactured by coating, by applying markings of contrasting color and then adding a final coat of transparent or translucent material of the same nature as the main body of the product, to become integral therewith. The final coat or coats may be dipped, sprayed or brushed on.

While I have described specific constructional embodiments of my invention, changes in the manner of applying the marking may be made to suit different requirements, and different materials, without departing from the spirit and the scope of the invention as defined in the appended claims.

I claim:

1. The method of forming a marked article of thin rubber comprising the steps of coating a form of a desired configuration with rubber solution, allowing the solution to dry, marking the outer surface of the dried solution with ink, and applying translucent rubber solution to the marked and previously dried rubber solution to provide an outer coating serving to impart added thickness to the article and constituting a translucent shield for the marking.

2. The method of forming a marked article of thin translucent rubber comprising the steps of coating a form of predetermined configuration with translucent rubber solution, allowing the rubber solution to dry, marking the outer surface of the dried solution with dry carbon ink, and applying additional translucent rubber solution to the marked and previously dried solution to impart additional thickness to the article and provide a translucent shield for the marking.

JOHN M. AUZIN.